United States Patent Office 2,932,609
Patented Apr. 12, 1960

2,932,609

ELECTROFORMING MILLIMETER WAVE COMPONENTS

Norman J. Pierce, Middletown, N.J., assignor to Bell Telephone Laboratories, Incorporated, New York, N.Y., a corporation of New York No Drawing. Application July 21, 1958
Serial No. 749,662

5 Claims. (Cl. 204—20)

This invention relates to a process for metallizing nonconducting surfaces in a manner particularly suitable to the manufacture of millimeter wavelength waveguide components by electroforming techniques.

As the trend toward higher frequencies in microwave work progresses, it becomes increasingly difficult to fabricate to the required degree of mechanical precision the small microwave components needed. The small, high precision, internal dimensions of these high frequency components become so difficult to achieve by machining or casting as to be impractical. It has thus become evident that some other process for producing the required waveguide components is needed. Electroforming appears to be an answer since the high precision internal dimensions of the component to be made becomes the outside dimension of a mandrel, and are consequently much easier to control by usual shop techniques, and since there is no separating medium between the mandrel and the electroformed component, the mechanical accuracy of the inside dimensions of such component is a direct function of the dimensional accuracy of the outside dimensions of the mandrel over which they are formed.

Electroforming as such is well known. The electroforming process is essentially one of providing a suitable mandrel such as wax, polystyrene, aluminum or stainless steel, which is a negative of the part to be formed, making it conductive, as in the case of the non-conducting mandrels like wax or polystyrene, and then building up a coat of electrically deposited metal to a thickness consistent with the mechanical strength required of the part in question. Parts electroformed on mandrels reproduce their surface finish and dimensions very closely. If the part to be made is a straight section or a tapered section from which the mandrel can be withdrawn, then a permanent mandrel of stainless steel or aluminum can be used. If, however, the part required has reentrant sections from which the mandrel cannot be withdrawn, then a disposable mandrel must be used.

The use of non-conducting mandrels requires that the mandrel be rendered conducting by some means before it can be used in the electroforming process. Numerous methods have been used in the past. However, these methods have either proved to be too complicated, and hence too costly, or they have proved inadequate for producing microwave components. The latter limitation on the prior art techniques has often been determinative, since even the most complicated and time-consuming electroforming process produced microwave components which were completely useless. For example, when polystyrene mandrels were first used, they were metallized by chemically producing a silver deposit on them. This method was abandoned, however, because the silver so deposited was found to be spongy and produced a higher surface resistivity than could be tolerated when parts so made were used as high frequency microwave components. Other illustrations of metallizing techniques currently known involve silvering the mandrel surface by spraying on a silver solution, metallizing by evaporation, or simply graphite coating of the mandrel. However, each of these processes involve special problems of handling and equipment or are time consuming and costly.

It is, therefore, an object of this invention to provide a process for applying to the surface of a non-conducting material a conductive layer having characteristics suitable for the subsequent electroforming of microwave components.

It is a further object of this invention that such conducting surface form an electrically smooth and continuous waveguiding boundary upon which a dense and continuous layer of metal may be deposited.

In accordance with the invention, the surface of the non-conducting mandrel, having the desired shape and dimensions, is wetted with a suspension of graphite in a volatile medium. Upon evaporation of the medium a layer of graphite is deposited on the surface. The form is then again wetted with a suspension of graphite and finely dispersed metallic particles such as iron, also in a volatile medium. Upon evaporation, a coating of graphite and metal is deposited on the surface over the first coating. The mandrel is then immersed in a copper salt solution, such as copper sulphate, in which the metallic particles of the second coating are replaced by elemental copper. The copper layer so deposited forms a low resistance path which may then be utilized as a cathode for the electrolytic deposition of additional metal.

Mandrels treated in accordance with the invention produce millimeter wave components to the required mechanical precision and electrical efficiency. It is a feature of the process that it is simple, requiring no special equipment or facilities, and thus is particularly suitable to be practiced in small laboratories. In addition, the time required to treat the mandrel and electroform the components is sufficiently short to be commercially attractive.

The invention may be better understood by referring to the following detailed description in which the several steps involved in practicing the invention are set forth.

A mandrel for use in the process herein described may be made of any suitable material that can be conveniently molded or machined to the desired shape, surface smoothness, and accuracy, that has sufficient mechanical strength to retain its shape with handling and that is sufficiently unreactive in the plating medium. Hard wax is such a suitable mandrel material and is used when the part to be formed is a completely self-contained structure having no wires, metallic foils or other added parts that require the cementing of such parts to the wax. Wax is generally used when the shape to be formed is complex; however, it may be used for any shape mandrel since it is readily removed from the finished form by heating and immersion in an appropriate solvent.

Mandrels which cannot be conveniently fabricated as a single unit or which contain additional parts such as wires, foils or fins, are made in sections of some suitable plastic material such as polystyrene, and are subsequently assembled. The various parts are held in place by means of suitable jigs and are cemented by flowing an appropriate cement or solvent into the joints to be bonded with the aid of a hypodermic syringe. Mandrels made of polystyrene, for example, may be cemented with chloroform. After the cement has hardened, any excess plastic material which has run over the various metallic surfaces is then mechanically removed so that the metal may be electrically bonded into the electroformed structure.

After assembling, the mandrel is washed to remove any foreign matter, such as skin oils which may have been deposited on the mandrel as a result of handling. This may be done in a water-soluble detergent solution, using, for example, any of the currently available ethylene glycol or phosphate types of detergent. While improper washing leaves grease spots which could result in irregular plating, as a practical matter, this does not often occur due to the use of an alcohol "dag" in subsequent steps which tends to dissolve and remove any grease from improperly washed areas.

The washed mandrel is dried either by letting it stand or by blowing air over it. The process is hastened if the air is warmed. However, with wax mandrels there is a danger of deforming the mandrel if the air temperature is raised appreciably above room temperature.

After drying, a thin electrically-conductive coating is deposited upon the mandrel surface. The deposit is made by either brushing, spraying or dip-coating the mandrel assembly with a liquid suspension of the conductive material. The liquid vehicle for the suspension must be sufficiently volatile for ease of drying, and be capable of wetting the mandrel without dissolving, or otherwise substantially affecting the surface. A colloidal suspension comprising graphite and isopropyl alcohol has been successfully used for this purpose. Such suspensions are commercially available under the trade name "Dag 154," which when thinned down with an equal part of alcohol, for ease of application, produces good coverage over the mandrel surface. Since this layer is normally removed when the mandrel is removed, the thickness of the graphite coating is kept small so as not to substantially alter the mandrel dimensions.

After applying the first conductive coating, the mandrel is dried as before and a second coating applied. The second coating, similar to the first, contains, in addition to the graphite, a metallic powder such as elemental iron, zinc, or cadmium or any one of the less active metals above copper in the electrochemical series which do not form an impervious oxide layer. Good results are obtained by adding carbonyl iron powder, particle size about five microns, to No. 154 alcohol dag so that the weight of the suspended graphite and the weight of the added iron powder are about equal. The proportion of iron powder to graphite powder, however, is not critical. Enough iron should be added to get good coverage, but not enough to thicken the dag solution and interfere with the ease of application. When applying the second coat, as with the first coat, particular attention should be paid to deep recesses and irregularities in the mandrel surface, to ensure complete coverage of the mandrel by the successive conductive coatings. As with the first coating, the iron-graphite coating is thinly applied to avoid any substantial changes in the mandrel dimensions. During use, the iron-graphite suspension is continuously agitated to prevent the iron from settling out of the suspension.

After the second coating is applied, the mandrel is dried, and then immersed in a copper-salt "replacement" solution.

The purpose of the replacement solution is to lay down, what, in essence, is the inside layer of the component being fabricated. This layer is produced by a chemical displacement process wherein the elemental iron deposited on the mandrel by the second coating operation, replaces the copper ions in the copper salt solution. The copper, in turn is reduced to metallic copper on the mandrel surface. This copper film forms the innermost permanent surface of the device to be electroformed, and for this reason it is most important that the mandrel be completely coated by the two coating solutions, particularly in any deep recesses or on any irregular surface regions.

The composition of the copper replacement solution is not critical and may be the same as a typical copper electroplating solution, i.e., 250 grams of copper sulphate per liter of distilled water, to which is added 40 milliliters of sulphuric acid. There is, however, considerable leeway in the amount of copper salt which may be used. Thus, the concentration may be increased or decreased greatly, the minimum requirement being that there be sufficient copper available to replace all of the iron on the mandrel. Similarly, the sulphuric acid is not essential, it being added merely to hasten the coating process.

Upon immersion, the copper will begin to replace the iron on the mandrel surface immediately. To ensure as uniform, and as complete coverage as possible, a camel's hair brush is used to brush the surface of the submerged assembly. Such imperfections in the copper coating as result, however, are substantially bridged by the initial graphite coating, thus allowing the plating process to proceed smoothly.

At the end of from three to five minutes, the replacement process is complete, as evidenced by the uniformly bright copper color of the mandrel surface. The assembly is then removed from the replacement solution and thoroughly rinsed in clear water and immediately removed to the plating bath.

Once the initial copper coating has been deposited, the assembly should not be handled with bare fingers nor exposed to the air for any appreciable time since contamination of the copper surface will interfere with the coating process.

Electroforming takes place in an acid copper bath in which the proportions of copper sulphate and sulphuric acid may vary over wide limits and still permit satisfactory deposits to be secured. However, a smoother plated surface was obtained when the pH range of the bath was maintained between 3 and 5 in a solution containing 250 grams of copper sulphate per liter of distilled water. The bath is agitated by rotating the mandrel during the plating operation. However, it was necessary to periodically reverse the direction of rotation to reduce the "shadowing" of the deposited copper in the corners and deep recesses. Whereas heating the plating baths may be used to increase the plating rate, it is felt that the advantages are not worth the expense and effort. Hence, all the work is carried out at room temperature.

Ideal conditions would dictate that long tanks should be used in electroforming operations so every point on the cathode structure being plated would be equidistant from any point on the anode. These conditions are nearly impossible to meet in small scale laboratory operations. A reasonable approach to the condition of equal path lengths can be, and was met, in this laboratory setup where small tanks were used, by shielding the anode. In the case of one- and two-gallon cylindrical tanks, a shield is placed inside the cylindrical anode so the copper ions from the anode are forced to travel down through the holes in the bottom edge of the shield or up through holes in the top edge of the cylindrical shield on their way to the cathode structure. This expedient helps greatly in controlling the buildup of the deposit on particularly irregular surface regions. As a further expedient to prevent unwanted buildup on the end of a long structure, after a sufficient thickness of deposit had been obtained, the end of the structure being electroformed is selectively shielded by sinking a beaker, open end up, in the tank so the end of the structure extends down into the beaker and thus lengthens the path to decrease any further deposit.

Control of the crystal size of the electroformed pieces requires that the plating in most cases be carried out at a relatively low rate, in the range of from 30 to 100 milliamperes per square inch. Fifty milliamperes per square inch is about average and at this rate the thickness of the copper deposited is about .4 mil per hour. The low plating rate is usually necessary where the pieces being electroformed are left in the tanks continuously and unattended for a large part of the time.

In all cases it is understood that the specific processes described in detail are to be taken only as illustrative of the general principles of the invention. Various modifications may be made therein by one skilled in the art without departing from the spirit and scope of the invention.

What is claimed is:
1. A method of metallizing a non-conducting surface comprising wetting said surface with a first suspension comprising graphite in a volatile medium, evaporating the volatile medium contained in said first suspension so as to deposit a layer of graphite on said surface, wetting said surface with a second suspension comprising graphite and a finely dispersed elemental metal selected from the group consisting of iron, zinc and cadmium, in a volatile medium, evaporating the volatile medium contained in said second suspension so as to deposit a layer of graphite and metal on said surface, and immersing said surface in a copper salt solution so as to deposit a layer of metallic copper on said surface.

2. The method of metallizing a non-conducting surface according to claim 1 wherein said surface is wetted by said first and said second suspension by brushing, wherein said volatile medium in said first and said second suspensions is an alcohol, wherein said elemental metal is iron and wherein said copper salt is copper sulphate.

3. The method according to claim 1 wherein the layer of metallic copper is deposited by a chemical displacement plating process.

4. An electroforming method comprising wetting the surface of a non-conducting mandrel with a first suspension consisting essentially of graphite in a volatile medium, evaporating the volatile medium contained in said first supension so as to deposit a layer of graphite on said surface, wetting said surface with a second suspension consisting essentially of graphite and an elemental metal selected from the group consisting of iron, zinc and cadmium, in a volatile medium, evaporating the volatile medium contained in said second suspension so as to deposit a layer of graphite and metal on said surface, immersing said mandrel in a copper salt solution so as to deposit a layer of metallic copper on said mandrel by the chemical replacement of said metal and utilizing said metallized copper layer as a cathode for the electrolytic deposition of a layer of metal thereon.

5. The method according to claim 4 wherein the electrolyte for said electrolytic deposition has a pH of between 3 and 5.

References Cited in the file of this patent
UNITED STATES PATENTS

| | | |
|---|---|---|
| 1,440,678 | Hachmann | Jan. 2, 1923 |
| 1,472,244 | Daly | Oct. 30, 1933 |
| 2,007,025 | Rieser | July 2, 1935 |
| 2,548,765 | Banks | Apr. 10, 1951 |

OTHER REFERENCES

Principles of Electroplating and Electroforming—Blum et al., Third Edition (1949), McGraw-Hill Book Company Inc., New York, pages 228–229.

Metal Finishing, August 1940, pages 433–436.